US008421426B2

(12) United States Patent
La Rosa et al.

(10) Patent No.: US 8,421,426 B2
(45) Date of Patent: Apr. 16, 2013

(54) CONSTANT CURRENT DRIVING DEVICE HAVING AN IMPROVED ACCURACY

(75) Inventors: Roberto La Rosa, Catania (IT); Massimo Michele Antonio Sorbera, Valverde (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 269 days.

(21) Appl. No.: 12/751,919

(22) Filed: Mar. 31, 2010

(65) Prior Publication Data
US 2010/0244790 A1 Sep. 30, 2010

(30) Foreign Application Priority Data
Mar. 31, 2009 (IT) .............................. MI2009A0518

(51) Int. Cl.
*G05F 1/00* (2006.01)
*G05F 3/16* (2006.01)

(52) U.S. Cl.
USPC ........... 323/272; 323/284; 323/285; 323/316; 323/317

(58) Field of Classification Search .................. 323/268, 323/271, 272, 282, 283, 284, 285, 311, 312, 323/315, 316, 317; 327/490, 530, 538
See application file for complete search history.

(56) References Cited

U.S. PATENT DOCUMENTS
5,739,678 A 4/1998 Nagaraj
6,320,771 B1 * 11/2001 Hemena et al. ................. 363/70
7,023,182 B1 * 4/2006 Kleine et al. ................... 323/212
7,466,116 B2 * 12/2008 Sato et al. ...................... 323/285
2004/0036460 A1 * 2/2004 Chatal ............................. 323/313
2004/0046535 A1 * 3/2004 Duffy et al. .................... 323/283
2008/0012742 A1 * 1/2008 Wu et al. ......................... 341/155
2009/0026977 A1 1/2009 Omi
2010/0315017 A1 * 12/2010 Yu et al. ......................... 315/291

OTHER PUBLICATIONS
Italian Search Report based on Italian Application No. MI20090518, Ministero Dello Sviluppo Economico, Munich, Nov. 12, 2009.

* cited by examiner

*Primary Examiner* — Adolf Berhane
*Assistant Examiner* — Lakaisha Jackson
(74) *Attorney, Agent, or Firm* — Graybeal Jackson LLP

(57) ABSTRACT

An embodiment of a driving device is proposed for supplying at least one regulated global output current to a load. The driving device includes programming means for programming a value of the global output current within a global current range. Reference means are provided for supplying a reference voltage, which has a value corresponding to the value of the global output current. Conversion means are then used for converting the reference voltage into the global output current. In the driving device according to an embodiment of the disclosure, the conversion means include a plurality of conversion units for corresponding partial current ranges, which partition the global current range. Each conversion unit is adapted to convert the reference voltage into a partial output current that contributes to the global output current, with the partial output current that is within the corresponding partial current range. The driving device further includes control means for selectively enabling the conversion units according to the partial current range wherein the global output current falls and for controlling the reference voltage so as to swing in a partial voltage range for each partial current range (with the partial voltage ranges that are at least partly superimposed).

12 Claims, 5 Drawing Sheets

CONSTANT CURRENT DRIVING DEVICE HAVING AN IMPROVED ACCURACY

PRIORITY CLAIM

The present application claims priority to Italian Patent Application No. MI2009A000518, filed Mar. 31, 2009, which application is incorporated herein by reference in its entirety.

SUMMARY

Embodiments of the present disclosure relate to the field of electronics, and more specifically to the driving of loads at regulated current.

Circuits capable of driving loads of various type at regulated current are of common use; such driving circuits ideally act as current generators, which supply an output current being substantially constant (regardless of load variations and external conditions). For example, the driving circuits may be used to drive light-emitting diodes (LED), so as to control their brightness (which depends on the current that crosses such LEDs).

Very often, the driving circuits are programmable to provide different values of the output current (for example, through an external resistor, which defines a reference voltage that is converted into the output current); in this way, a same driving circuit may be used to drive LEDs of different type.

Typically, in order to allow a wide variety of usage of the driving circuits, the output current is programmable in a working range being relatively wide (from a minimum output current to a maximum output current that may be supplied by the driving circuit); for example, standard working ranges run from 1-3 mA to 50-90 mA.

A problem of known driving circuits is assuring a sufficient accuracy of the output current. Such problem is particularly perceived when a high number of driving circuits is used to drive corresponding LEDs—for example, in liquid crystal displays (LCDs) for monitors, signal panels, and the like. In such context it may be of the utmost importance that all the LEDs are controlled uniformly. In fact, each LED defines a basic display element (pixel) of the panel; therefore, any non-uniformity in the control of the LEDs may cause corresponding differences of their brightness, which differences may become display defects on the panel.

Normally, the driving circuits are integrated in a chip of semiconductor material. In such case, a driving device includes a set of driving circuits (for example, from 8 to 36), each one defining a corresponding channel of the driving device; hence the driving device is provided with multiple output terminals (a terminal for each channel), which supply the same output current to corresponding LEDs.

In order to offer the demanded quality in most of the practical applications, the driving devices have a high accuracy from one channel to another and from one chip to another (such accuracy being defined as the allowed percentage of maximum variation of the output current); for example, typical values of the accuracy channel to channel and of the accuracy chip to chip are 1-3% and 3-6%, respectively.

However, such values of accuracy are extremely difficult to obtain over the entire working current range of the driving device when such range is very wide. In particular, such a problem may appear in a more evident way at low values of the output current (values being close to the minimum current); in fact, in such conditions all the error sources of the output current may have a higher relative weight with respect to the output current, and may even be of the same order of magnitude—for example, with an offset voltage of an operational amplifier used to convert the reference voltage into the output current that becomes comparable with said reference voltage.

A solution commonly used to tackle such problem is limiting the error sources. For example, for this purpose it may be possible to increase the size of the driving device. Alternatively, it may be possible to make the operational amplifier with a low offset voltage; however, this may require a heavy trimming and a higher circuit complexity of the driving device. Anyhow, such "tricks" may negatively affect the final cost of the driving device (and hence of any system wherein the driving device is used).

Therefore, in its general terms, an embodiment of the disclosure is based on the idea of partitioning the output current.

More specifically, an embodiment of the disclosure proposes a driving device for supplying at least one regulated global output current to a load. The driving device includes programming means for programming a value of the global output current within a global current range. Reference means are provided for supplying a reference voltage, which has a value corresponding to the value of the global output current. Conversion means are then used to convert the reference voltage into the global output current. In the driving device according to an embodiment of the disclosure, the conversion means include a plurality of conversion units for corresponding partial current ranges, which partition the global current range. Each conversion unit is adapted to convert the reference voltage into a partial output current that contributes to the global output current, with the partial output current that is within the corresponding partial current range. The driving device further includes control means for selectively enabling the conversion units according to the partial current range wherein the global output current falls and for controlling the reference voltage so as to swing in a partial voltage range for each partial current range (with the partial voltage ranges that are at least partly superimposed).

A further embodiment of the disclosure proposes a system including at least one of such driving devices and at least one load to receive the global output current.

A different embodiment of the disclosure proposes a corresponding driving method for supplying at least one regulated global output current to a load.

BRIEF DESCRIPTION OF THE DRAWINGS

One or more embodiments of the disclosure, as well as features and the advantages thereof, will be best understood with reference to the following detailed description, given purely by way of a non-restrictive indication, to be read in conjunction with the accompanying drawings (wherein corresponding elements are denoted with equal or similar references, and their explanation is not repeated for the sake of exposition brevity). In particular.

DETAILED DESCRIPTION

Figure 1:
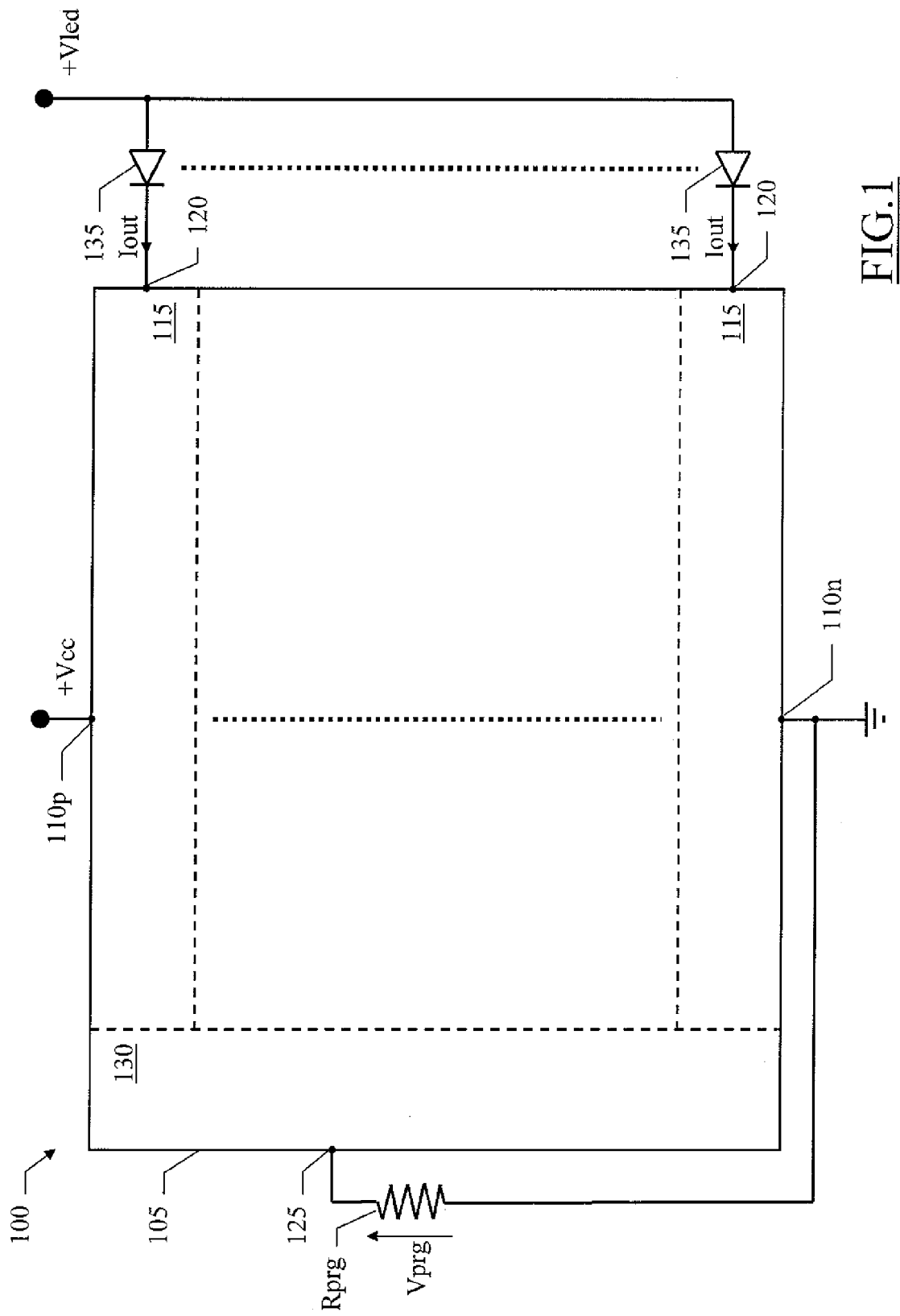
FIG. 1 is a schematic block diagram of a system wherein a driving device according to an embodiment of the disclosure can be used.

In particular with reference to FIG. 1, there is shown a schematic block diagram of an embodiment of a system 100 wherein a driving device 105 according to an embodiment of the disclosure may be used. In particular, the driving device 105 (being integrated in a chip of semiconductor material) is provided with a negative supply terminal 110n and a positive supply terminal 110p; the terminal 110n is coupled to a terminal that provides a supply voltage +Vcc (for example, 1-5V with respect to ground). The driving device 105 includes a set of driving circuits 115 (for example 8-36), each one defining a corresponding channel of the driving device 105; each driving circuit 115 supplies an output current Iout to a corresponding output terminal 120 (with the currents Iout of all the driving circuits 115 having the same value). The driving device 105 is also provided with a programming terminal 125. A programming resistor Rprg is coupled between the terminal 125 and the ground terminal. The resistor Rprg is used to program the current Iout within a working range of the driving device 105, from a minimum output current Iout(min) (for example, 1-3 mA) to a maximum output current Iout(max) (for example, 50-90 mA). In particular, the value of the current Iout is defined by the resistance of the resistor Rprg (hereinafter, the values of electric magnitudes are denoted with the same symbols used to identify the corresponding components in the figures). For this purpose, a control circuit 130 of the driving device 105 receives a programming voltage Vprg at the terminals of the resistor Rprg, and said control circuit 130 controls all the driving circuits 115 accordingly.

Each terminal 120 of the driving device 105 supplies the current Iout to a corresponding external load; for example, the load consists of a LED 135, which has an anode terminal being coupled to a terminal that provides a supply voltage +Vled (for example, 1-5V with respect to ground) and a cathode terminal being coupled to the terminal 120. For example, the system 100 is used in an LCD panel (not shown in figure).

Figure 2:
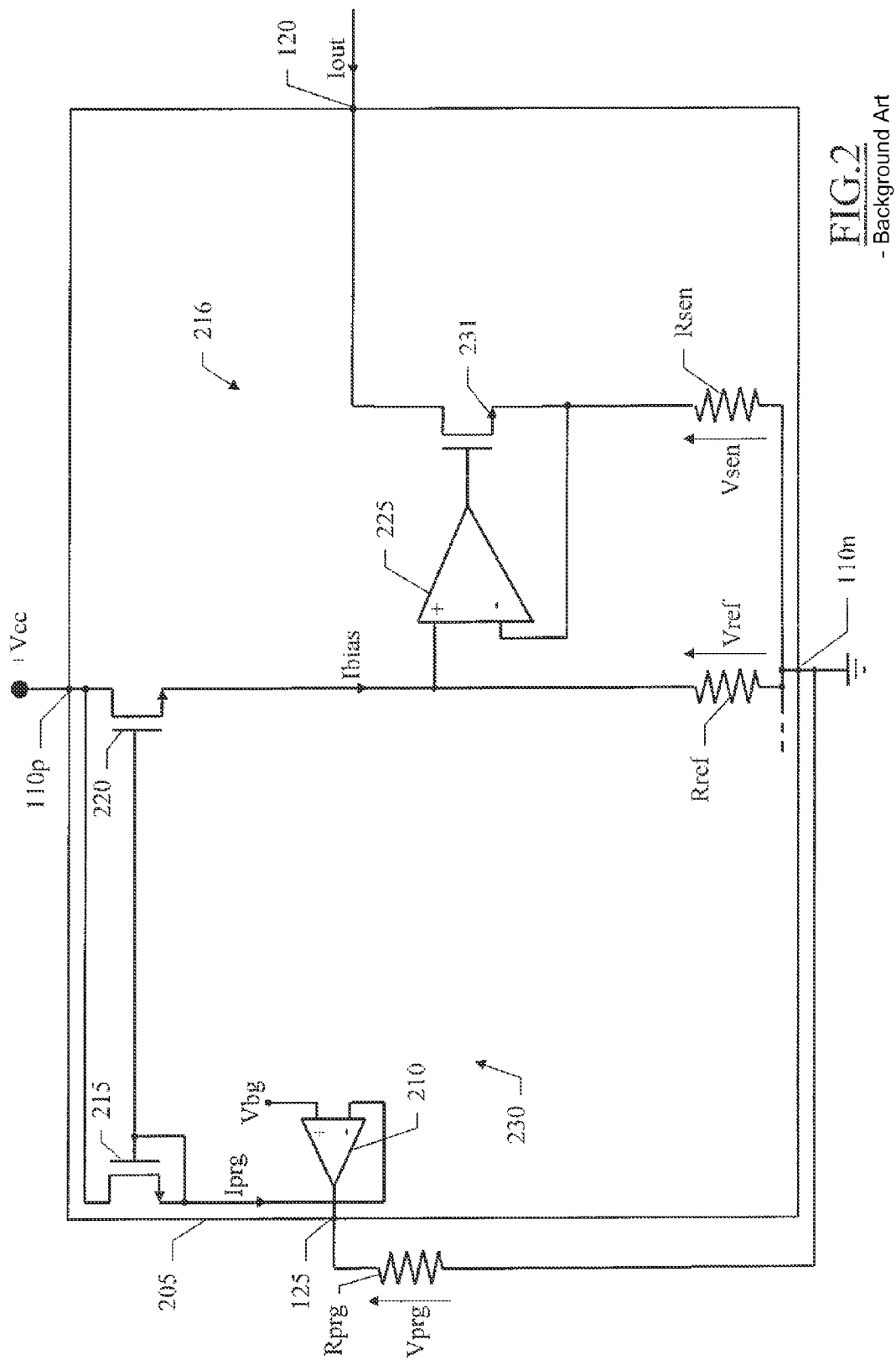
FIG. 2 is a simplified circuit diagram of a conventional driving device.

Turning to FIG. 2, there is shown a simplified circuit diagram of the driving device (denoted with the reference 205) according to a known implementation. In detail, the control circuit (denoted with the reference 230) includes a buffer formed by an operational amplifier 210 in voltage-follower configuration. The operational amplifier 210 has a non-inverting input terminal (+) that receives a band-gap voltage 205 (from a corresponding circuit not shown in figure), which is substantially constant around a theoretical value of 1.22V (for example, 1.2-1.3V); moreover the operational amplifier has an output terminal being coupled to the terminal 125 (and hence to the resistor Rprg), and an inverting input terminal (−) being short-circuited to the output terminal thereof. The output terminal of the operational amplifier 210 is also coupled to a current mirror formed by two NMOS transistors 215 and 220. In particular, the transistor 215 has a drain terminal being coupled to the terminal 110p (so as to receive the voltage +Vcc), a source terminal being coupled to the output terminal of the operational amplifier 210, and a gate terminal being short-circuited to the source terminal thereof; the transistor 220 has a drain terminal being coupled to the terminal 110p, a gate terminal being coupled to the gate terminal of the transistor 215, and a source terminal being coupled to a voltage-current converter of each driving circuit (only one, denoted with the reference 216, being detailed in figure).

In particular, the driving circuit 216 includes an operational amplifier 225 having a non-inverting input terminal (+) being coupled to the source terminal of the transistor 220. A reference resistor Rref is then coupled between the non-inverting input terminal of the operational amplifier 225 and the ground terminal; a sensing resistor Rsen is instead coupled between an inverting input terminal (+) of the operational amplifier 225 and the ground terminal. The driving circuit 216 also includes a power NMOS transistor 231, which has a source terminal being coupled to the inverting input terminal of the operational amplifier 225, a drain terminal being coupled to the terminal 120 (for supplying the corresponding output current Iout), and a gate terminal being coupled to an output terminal of the operational amplifier 225.

In operation, a user of the driving device 205 programs the value of the current Iout thorough the resistor Rprg. In fact, the operational amplifier 210 applies the voltage Vbg to the terminal 125; as a consequence, a programming voltage Vprg at the terminals of the resistor Rprg will be Vprg=Vbg, so that the resistor Rprg is crossed by a programming current Iprg=Vprg/Rprg=Vbg/Rprg. Such current Iprg is transferred from the current mirror 215, 220 to each driving circuit 216, which hence receives a biasing current Ibias=Iprg=Vbg/Rprg. The biasing current completely flows through the resistor Rref (inasmuch as the operational amplifier 225 has an input resistance that is large, being ideally infinite), and generates a corresponding reference voltage Vref=Rref·Ibias=(Rref/Rprg)·Vbg. At the terminals of the resistor Rsen there is hence applied a sensing voltage Vsen=Vref=(Rref/Rprg)·Vbg because of the virtual ground of the operational amplifier 225. Therefore, through the resistor Rsen there will flow a current $$Iout = Vsen/Rsen = \frac{Rref}{Rprg \cdot Rsen} \cdot Vbg,$$

which is transferred to the terminal 120 by the transistor 231 (that provides the necessary power). It is hence clear that the current Iout changes according to the resistance Rprg (Vbg, Rref and Rsen being fixed). For example, it is possible to program any value of the current Iout in the range WR=1-40 mA by supplying, to the resistor Rref, the current Ibias with a corresponding value from Iprg(min)=10 μA (for the current Iout(min)=1 mA) to Iprg(max)=400 μA (for the current Iout (max)=40 mA), which is obtained by setting the resistance Rprg from Vbg/Iprg(min)=1.25V/10 μA=125 kΩ to Vbg/Iprg (max)=1.25V/400 μA=3.125 kΩ, respectively.

In order to ensure the correct biasing of the diode coupled to the terminal 120, the voltage thereof has a minimum value Vmin necessary to allow the transistor 231 to supply the demanded current even at the value Iout(max) (for example, Vmin=0.5-2V). This imposes a corresponding upper limit to the voltage Vsen (when the resistor Rsen is crossed by the current Iout(max)), and hence to the resistance Rsen. However, in this way a corresponding upper limit is imposed to the voltage Vsen when the driving circuit 216 supplies the current Iout(min) (which crosses the resistor Rsen); the same upper limit applies in this condition also to the voltage Vref=Vsen, which then can assume values of the same order of magnitude of an offset voltage of the operational amplifier 225. This makes it difficult to impossible to ensure an acceptable accuracy level of the driving circuit 216. For example, assuming that the voltage drop at the terminals of the transistor 231 is Vds=0.4V (at the current Iout(max)=40 mA), in case Vmin=1V it is obtained that the resistance Rsen can be at most equal to Vmin−Vds)/Iout(max)=(1-0.4V)/40 mA=15Ω. Therefore, when the driving circuit 216 supplies the current Iout(min)=1 mA, the voltage Vsen decreases to the value Vsen=Rsen·Iout(min)=15Ω·1 mA=15 mV. The voltage Vref=Vsen=15 mV is hence comparable with the typical values of the voltage Vos=1-3 mV (for example, Vos=2 mV), which can then cause unwanted changes of the voltage Vsen=Vref+Vos (and hence of the current Iout) of the order of 1-3V/15 mV=7-20%.

More formally, it is known that the variance σ of a generic magnitude Y=f(Xi) being function of one or more statistically independent variables Xi (with i=1 ... N) is defined by the formula $$\sigma(Y) = \sqrt{\sum_{i=1}^{N} \left(\frac{df}{dXi}\right)^2 \cdot \sigma(Xi)^2}.$$

In the particular case of the current Iout=(Vref+Voc)/Rsen, it is obtained:

$$\sigma(Iout) = \sqrt{\begin{matrix}\left(\frac{dIout}{dVref}\right)^2 \cdot \sigma(Vref)^2 + \\ \left(\frac{dIout}{dVos}\right)^2 \cdot \sigma(Vos)^2 + \\ \left(\frac{dIout}{dRsen}\right)^2 \cdot \sigma(Rsen)^2\end{matrix}} =$$

$$\sqrt{\begin{matrix}\left(\frac{1}{Rsen}\right)^2 \cdot \sigma(Vref)^2 + \\ \left(\frac{1}{Rsen}\right)^2 \cdot \sigma(Vos)^2 + \\ \left(-\frac{1}{Rsen^2}\right)^2 \cdot \sigma(Rsen)^2\end{matrix}} = \sqrt{\frac{\sigma(Vref)^2}{Rsen^2} + \frac{\sigma(Vos)^2}{Rsen^2} + \frac{\sigma(Rsen)^2}{Rsen^4}}.$$

In practice, the terms corresponding to the voltage Vref and to the resistance Rsen can be considered as constant, so it results:

$$\sigma(Iout) \cong \sqrt{\frac{\sigma(Vos)^2}{Rsen^2}}.$$

The accuracy of the current Iout is defined by the opposite of the differential thereof at a pre-defined multiple of the variance (for example, 1σ):

$$\frac{DIout}{Iout} = \frac{\sqrt{\frac{\sigma(Vos)^2}{Rsen^2}}}{\frac{Vref + Vos}{Rsen}} = \sqrt{\frac{\sigma(Vos)^2}{Rsen^2} \cdot \frac{Rsen^2}{(Vref + Vos)^2}} = \sqrt{\frac{\sigma(Vos)^2}{(Vref + Vos)^2}}.$$

It is hence evident that for obtaining a high accuracy of the current Iout (that is, low values of the differential DIout/Iout) it is necessary to reduce the variance σ(Vos) of the voltage Vos (with heavy operations of trimming of the operational amplifier 225), or to increase the voltage Vref by reducing the voltage Vds (with a corresponding increase of the size of the transistor 231).

On the contrary, in an embodiment of the disclosure, the same or a similar result is obtained by changing the structure of the driving circuit. For this purpose, the (global) working range WR of the (global) output current Iout—from the (global) minimum current Iout(min) to the (global) maximum output current Iout(max)—is partitioned into a plurality of partial working ranges WR(j)—j=1 ... M, with M≥2; each range WR(j) varies from a partial minimum output current Iout(min)(j) to a partial maximum output current Iout(max)(j), with Iout(max)(j)=Iout(min)(j−1) starting from Iout(min)(0)=Iout(min) and arriving to Iout(max)(M)=Iout(max). The driving circuit is thus provided with corresponding output branches—one for each range WR(j)—which are all controlled by the same voltage Vref; the output branches are enabled selectively according to the range WR(j) of the current Iout.

In this way, it is possible to limit the variation of the voltage Vref as a consequence according to the lower extent of the ranges WR(j) with respect to the range WR. Therefore, once the upper limit of the voltage Vref at each current Iout(max)(j) is defined, as above there will result a value much higher than the voltage Vref at the corresponding current Iout(min)(j). This allows maintaining the voltage Vref significantly higher than the voltage Vos in any working condition. So the voltage Vos is always negligible with respect to the voltage Vref (also at the current Iout(min)). In such way, it is possible to obtain very high accuracy levels of the current Iout. Such result is achieved without significantly increasing the size of the driving circuit and without requiring heavy trimming operations. All that has a beneficial effect on the final cost of the driving device (and hence of every system wherein it is used).

Figure 3:
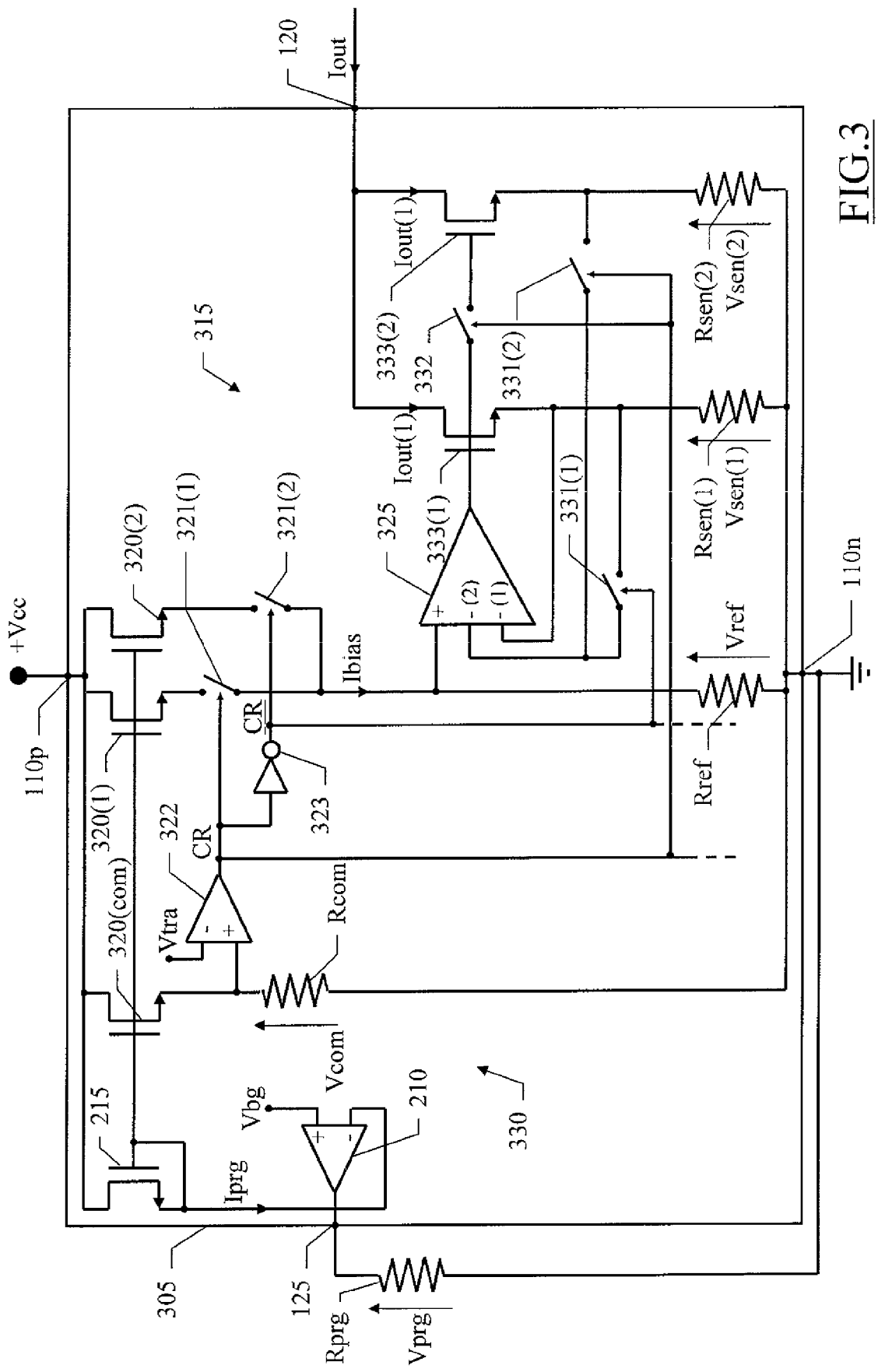
FIG. 3 is a simplified circuit diagram of a driving device according to an embodiment of the disclosure.

For example, in FIG. 3 there is shown a simplified circuit diagram of a driving device (denoted with the reference 305) according to an embodiment of the present disclosure. In such case, the range WR from Iout(min)=1 mA to Iout(max)=40 mA is partitioned into two ranges WR(1) and WR(2)—for example, with WR(1) from Iout(min)(1)=1 mA to Iout(max)(1)=6 mA, and WR(2) from Iout(min)(2)=6 mA to Iout(max)(2)=40 mA.

The control device (denoted with the reference 330) now includes a current mirror with an output branch for each range WR(1) and WR(2). As above, the current mirror has an input branch formed by the transistor 215, which is coupled to the output terminal of the operational amplifier. An NMOS transistor 320(1) and an NMOS transistor 320(2) are instead provided for the range WR(1) and the range WR(2), respectively; in particular, each transistor 320(1) and 320(2) has a drain terminal being coupled to the terminal 110p and a gate terminal being coupled to the gate terminal of the transistor 220. Each transistor 320(1) and 320(2) has a source terminal being coupled to a first terminal of an electronic switch 321(1) and 321(2), respectively; a second terminal of both the switches 321(1) and 321(2) is then coupled to the non-inverting input terminal of the operational amplifier 325.

The current mirror is further provided with a comparison output branch, which is formed by a corresponding NMOS transistor 320(com); the transistor 320(com) has a drain terminal being coupled to the terminal 110p, a gate terminal being coupled to the gate terminal of the transistor 215, and a source terminal being coupled to a positive (+) input terminal of a comparator 322; a comparison resistor Rcom is then coupled between the positive input terminal of the comparator 322 and the ground terminal. A negative (−) input terminal of the comparator 322 instead receives a pre-defined transition voltage Vtra (for example, derived from the voltage Vbg through a resistive divider not shown in figure). The comparator 322 has an output terminal, which is directly coupled to a control terminal of the switch 321(1); the same output terminal of the comparator 322 is instead coupled through an inverter 323 to a control terminal of the switch 321(2).

Turning now to the driving circuit (denoted with the reference 315), there is now provided an operational amplifier 325 with an inverting input terminal −(1) for the range WR(1) and another inverting input terminal −(2) for the range WR(2). The output branch for the range WR1 is formed by a sensing resistor Rsen(1) and a power NMOS transistor 333(1), while the output branch for the range WR(2) is formed by a sensing resistor Rsen(2) and a power NMOS transistor 333(2). The resistor Rsen(1) is coupled between the inverting input terminal −(1) of the operational amplifier 325 and the ground terminal. Concerning instead the other inverting input terminal −(2) of the operational amplifier 325, it is coupled to the ground terminal through both the resistor Rsen(1) in series to an electronic switch 331(1) and the resistor Rsen(2) in series to an electronic switch 331(2). The transistor 333(1) has a source terminal being coupled to the inverting input terminal −(1) of the operational amplifier 325, a drain terminal being coupled to the terminal 120, and a gate terminal being coupled to an output terminal of the operational amplifier 325; the transistor 333(2) has a source terminal being coupled to the common node between the resistor Rsen(2) and the switch 331(2), a drain terminal being coupled to the terminal 120, and a gate terminal being coupled through an electronic switch 332 to the output terminal of the operational amplifier 325. Each one of the switches 331(2) and 332 has a control terminal that is directly coupled to the output terminal of the comparator 322; the switch 331(1) has a control terminal that is instead coupled to the output terminal of the comparator 322 through the inverter 323.

In operation, the user of the driving device 305 programs as above the value of the current Iout within the working range WR through the resistor Rprg (from Rprg=125 kΩ with Iprg=(min)=10 µA for the current Iout(min)=1 mA to Rprg=3.125 kΩ with Iprg(max)=400 µA for the current Iout(max)=40 mA). The comparator 322 determines the working range WR(1) or WR(2) wherein the current Iout falls. In particular, the comparator 322 switches when the current Iprg crosses a transition value Iprg(tra) corresponding to the current Iout(max)(1)=Iout(min)(2), given by:

$$Iprg(tra) = \frac{Iout(\max)(1) - Iout(\min)(1)}{Iout(\max)(2) - Iout(\min)(2)} \cdot (Ibias(\max) - Ibias(\min)) + Ibias(\min)$$

In the example at issue, it results then:

$$Iprg(tra) = \frac{6mA - 1mA}{40mA - 6mA} \cdot (400\mu A - 10\mu A) + 10\mu A = 67.35\mu A.$$

For this purpose, the voltage Vtra is set equal to the value of a comparison voltage Vcom at the terminals of the resistor Rcom when it is crossed by the current Iprg(tra); for example, setting the resistance Rcom=10 kΩ it results Vtra=Rcom·Iprg (tra)=10 kΩ·67.35 µA=0.67V. Therefore, when the current Iout falls within the range WR(1), it will result Iprg<Iprg(tra) and hence Vcom<Vtra; in such condition, a control signal CR at the output terminal of the comparator 322 is de-asserted (to the logic value 0=0V, with a negated control signal $\overline{CR}$ being provided by the inverter 323 that is asserted (to the logic value 1=+Vcc). Instead when the current Iout goes to the range WR(2), it will result Iprg≧Iprg(tra) and hence Vcom≧Vtra; in such condition, the signal CR is asserted and the signal $\overline{CR}$ is de-asserted.

As a consequence the output branches 320(1), Rsen(1) and 320(2), Rsen(2) are enabled in succession. In fact, when the current Iout falls within the range WR(1), the switches 321(2) and 331(1) are turned on by the signal $\overline{CR}$ (asserted); at the same time, the switch 331(2) is turned off by the signal CR (de-asserted). In such condition, there is enabled only the output branch 333(1),Rsen(1) that supplies a partial output current Iout(1)—with Iout=Iout(1). When the current Iout instead falls within the range WR(2), the switches 331(2) and 332 are turned on by the signal CR (asserted), while the switch 331(1) is turned off by the signal $\overline{CR}$ (de-asserted). In such condition, there is enabled also the output branch 330 (2),Rsen(2) that supplies a current Iout(2) in addition—with Iout=Iout(1)+Iout(2). In this way, each output branch 330(1), Rsen(1) and 220(2),Rsen(2) only supplies a corresponding portion of the current Iout (defined by the current Iout(1) and Iout(2), respectively); in particular, each current Iout(j) varies from Iout(min)(j) to Iout(max)(j), so it is equal to a fraction $$F(j) = \frac{Iout(\max)(j) - Iout(\min)(j)}{Iout(\max) - Iout(\min)}$$

of the current Iout. In the example at issue, it results that the output branch 330(1),Rsen(1) supplies a fraction $$F(1) = \frac{6mA - 1mA}{40mA - 6mA} = 0.17 \cong 1/6$$

of the current Iout, while the output branch 330(2),Rsen(2) supplies a fraction $$F(2) = \frac{40mA - 6mA}{40mA - 1mA} = 0.87 \cong 5/6$$

of the current Iout.

As above, the resistance Rsen(2) can at most reach the value (Vmin−Vds)/Iout(max)(2)—for maintaining a sensing voltage Vsen(2) at the terminals of the resistor Rsen(2) within the demanded limits at the current Iout(max)(2)=Iout(max); in this case, however, when the output branch 330(2),Rsen(2) supplies the current Iout(min)(2), the voltage Vsen(2) decreases to the value Vsen(2)=Rsen(2)·Iout(min)(2)—being higher thanks to the higher current Iout(min)(2). The resistance Rsen(1) can instead have at most the value (Vmin−Vds)/Iout(max)(1)—being higher thanks to the lower current Iout(max)(1); when the output branch 330(1),Rsen(1) supplies the current Iout(min)(1), a sensing voltage Vsen(1) decreases hence to the value Vsen(1)=Rsen(1)·Iout(min) (1)—being higher thanks to the higher resistance Rsen(1). Therefore, the voltage Vref will vary now from Rsen(1)·Iout (min)(1) to Rsen(1)·Iout(max)(1) in the range WR(1) when only the output branch 330(1),Rsen(1) is enabled, and will vary from Rsen(2)·Iout(min)(2) to Rsen(2)·Iout(max)(2) in the range WR(2) when both the output branches 330(1),Rsen (1) and 330(2),Rsen(2) are enabled. As a consequence the resistors Rsen(1) and Rsen(2) are dimensioned with a resistance being inversely proportional to the current Iout(1) and Iout(2), respectively, which is supplied by them. In particular, when the resistance Rsen(2) of the last range WR(2) is set equal to the resistance Rsen in order to ensure the correct operation of the driving circuit 315, there is obtained that each resistance Rsen(J) is inversely proportional to the extent of the corresponding range WR(j) with respect to the extent of the range WR(2)—that is Rsen(J)=Rsen(2)·F(2)/F(J). In the example at issue, it results hence Rsen(2)=Rsen=15Ω and $$Rsen(1) = Rsen(2) \cdot \frac{F(2)}{F(1)} = Rsen \cdot \frac{5/6}{1/6} = 5 \cdot Rsen = 5 \cdot 15\Omega = 90\Omega.$$

So the voltage Vref will change from Rsen(1)·Iout(min)(1)= 90Ω·1 mA=90 mV to Rsen(1)·Iout(max)(1)=90Ω·6 mA=540 mV in the range WR(1), and will change from Rsen(2)·Iout (min)(2)=15Ω·6 mA=90 mV to Rsen(2)·Iout(max)(2)= 15Ω·40 mA=600 mV in the range WR(2). In both cases, the voltage Vref is always much higher than the typical values of the voltage Vos=1-3 mV.

Each transistor 333(1) and 333(2) can be dimensioned so as to have a current capability being equal only to the corresponding fraction F(1) and F(2), respectively, of the current Iout being supplied by the transistor. In particular, denoting with W/L the size of the above-described transistor (with a current capability being equal to Iout(max)), the size of the transistor 333(1) will be equal to W/L·F(1) and the size of the transistor 333(2) will be equal to W/L·F(2). In the example at issue, it results that the transistor 333(1) with a size W/6L, and the transistor 333(2) with a size 5W/6L. The proposed management of the output branches 333(1),Rsen(1) and 333(2), Rsen(2) allows maintaining the global sizes of the transistors 333(1) and 333(2) unchanged, which transistors have the highest impact on the global size of the driving circuit 315.

The lower the ratio between the current Iout(max)(j) and the current Iout(min)(j) of each range WR(j), the higher the minimum value of the voltage Vref=Vsen(1)=Vsen(2). For example, it may be possible to select the ranges WR(j) so as to have the voltage Vref always more than 50-150 times, for example, more than 80-120 times (for example, more than 100 times) the voltage Vos (for example, with the voltage Vref being higher than 50-150 mV, for example, higher than 80-120 mV—for example, higher than 100 mV). For this purpose, such ratio may have values from 4 to 8, for example from 5 to 7 (for example, about 6). In each case, it is noted that the amplitude of the range WR(j) grows in a substantially geometric progression. In fact, the ranges WR(j) have limited extent for low currents Iout(j) because of the high resistance Rsen(j), while they may have wider extents with the growing of the current Iout(j) with consequent decrease of the resistance Rsen(j). This allows obtaining the desired result with a very simple structure, which needs a very low number of output branches (generally, only two).

As pointed out above, the voltage Vref now has a sawtooth-shaped wave form, which grows from a minimum value thereof to a maximum value thereof in each range WR(j). As a consequence, the current Ibias=Vref/Rref will have the same sawtooth-shaped wave form. Such current Ibias is obtained by properly scaling the current Iprg; for this purpose, the output branches of the current mirror 215,320(1), 320(2) corresponding to the range WR(j) wherein the current Iout falls are alternatively enabled. In fact, when the current Iout falls within the range WR(1), the switch 321(1) is turned off by the signal CR (de-asserted), while the switch 321(2) is turned on by the signal $\overline{CR}$ (asserted); in such condition, the current Ibias is supplied by the transistor 320(2), which is dimensioned in order to have a mirroring ratio equal to 1 (so as to obtain (bias=Iprg). When the current Iout instead falls within the range WR(2), the switch 321(2) is turned off by the signal $\overline{CR}$ (de-asserted), while the switch 321(1) is turned on by the signal CR (asserted); in such condition, the current Ibias is supplied by the transistor 320(1), which is dimensioned so as to have a mirroring ratio equal to Iout(min)(2)/ Iout(min)(1) (so as to obtain Ibias=Iprg·Iout(min)(1)/Iout(min (2)). In the example at issue wherein the voltage Vref varies at most from 90 mV to 600 mV, the current Ibias (assuming Rref=9 kΩ) will varies at most from 90 mV/9 kΩ=10 μA to 600 mV/9 kΩ=66.7 μA. In fact, when the current Iout falls within the range WR(1), the current Ibias=Iprg varies from 10 μA to 60 μA (before reaching 66.6 μA); when the current Iout falls within the range WR(2), the current Ibias=Iprg·Iout (min)(1)/Iout(min(2)=Iprg·1 mA/6 mA=Iprg/6 changes from 60 μA/6=10 μA to 400 μA/6=66.7 μA.

Altogether, the larger size of the proposed driving device 305 may be considered as negligible. In fact, each driving circuit 315 only needs a further resistor Rsen(1) (equal to 5·Rsen in the example at issue) and a further input terminal of the operational amplifier 325 (that is, two further transistors)—while the power transistors 333(1),333(2) take up the same space (with the switches 331(1), 331(2) and 332 that may be negligible in size); besides, the control circuit 330 includes a further comparator 322 (with the transistor 320(1), the inverter 323 and the switches 321(1),321(2) that may be negligible in size). Moreover, it also noted that the driving device may omit the circuit being used for the trimming of the operational amplifier of the various driving circuits.

Figure 4:
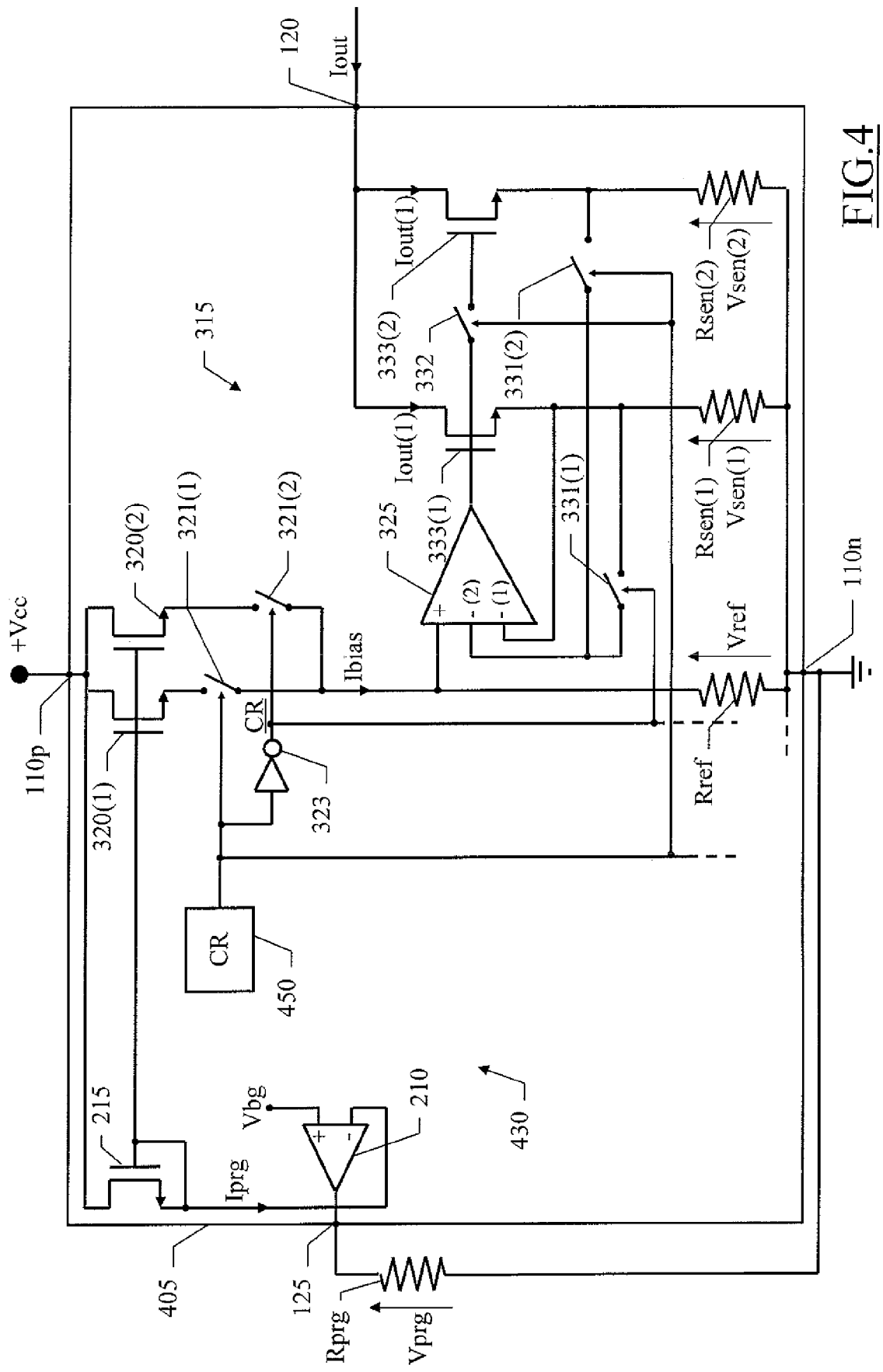
FIG. 4 is a simplified circuit diagram of a detail of a driving device according to another embodiment of the disclosure.

Turning now to FIG. 4, there is shown a simplified circuit diagram of the driving device (denoted with the reference 405) according to another embodiment of the present disclosure. In this case, in the control circuit (denoted with the reference 430) the components used to determine the range WR(1) or WR(2) wherein the current Iout falls are replaced with a simple register 450. The register 450 stores a bit that is de-asserted in the range WR(1) and asserted in the range WR(2). The register 450 is programmed from the outside through a corresponding interface of the programming device 450—for example, of the Serial Peripheral Interface (SPI) type. In this way, the register 450 directly provides the signal CR (with the operation of each driving circuit 315 that is quite similar to that previously described).

As a consequence, the structure of the driving device 405 is further simplified (hence reducing the size thereof). On the contrary, an additional programming operation is used (for setting the register 450 in addition to the selection of the resistor Rprg).

Figure 5:
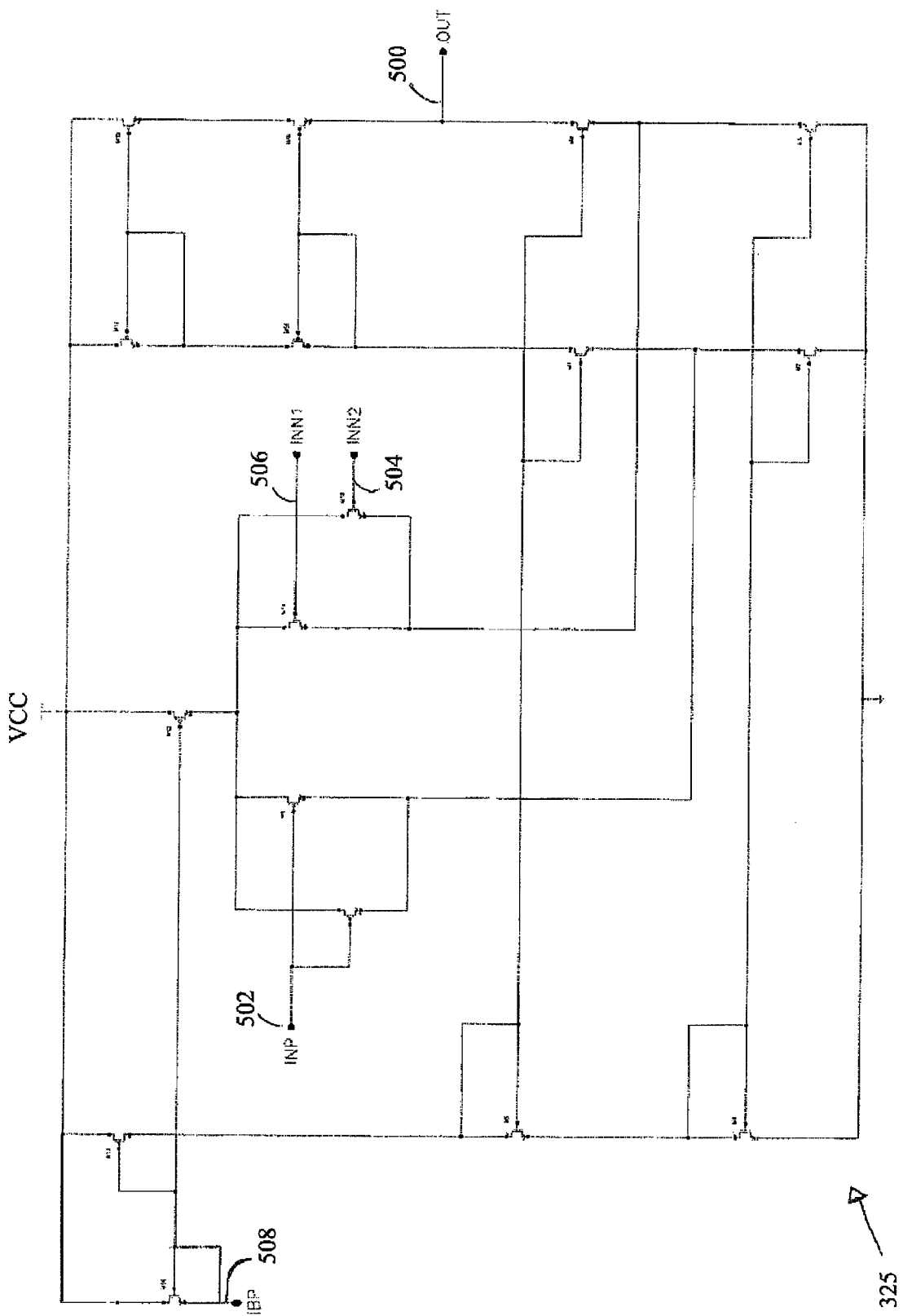
FIG. 5 is a schematic diagram of an embodiment of one of the operational amplifiers of FIGS. 3-4.

FIG. 5 is a schematic diagram of an embodiment of the operational amplifier 325 of FIGS. 3-4.

The amplifier 325 has an output node 500, which is the node coupled to the transistor 333(1) in FIGS. 3-4, and has input nodes 502, 504, and 506, which respectively form the nodes "+", "−(1)", and "−(2)" in FIGS. 3-4. A node 508 receives a bias current IBP.

Alternative embodiments of the amplifier 325 are contemplated. For example, some or all of the transistors may each be replaced with a transistor of the opposite type. For example, an NMOS transistor may be replaced with a PMOS transistor, and vice versa. Also, although the amplifier 325 is disclosed as including CMOS transistors, some or all of the transistors may be replaced with respective transistors of another type, such as bipolar.

Naturally, in order to satisfy local and specific requirements, a person skilled in the art may apply to the one or more embodiments described above many logical and/or physical modifications and alterations. More specifically, although described with a certain degree of particularity with reference to embodiment(s) thereof, it should be understood that various omissions, substitutions and changes in the form and details as well as other embodiments are possible. Particularly, an embodiment may even be practiced without the specific details (such as the numerical examples) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice.

In particular, similar considerations apply if the driving device has a different structure or includes equivalent components (either separate to each other or combined together, in whole or in part); moreover, the system may have different operative characteristics; for example, it may be possible to provide any number of driving devices (at worst only one), one reference resistor for all the driving devices, other means for programming the output current (for example, of the digital type), and the like. Besides, the driving device may have different operating characteristics (for example, different minimum and maximum output currents). Anyway, nothing prevents providing more partial working ranges for the output current (with corresponding output branches of each driving circuit). Naturally, the same driving device may be used to supply the demanded output current to any other kind of load (for example, in electronic opto-couplers).

In an embodiment of the present disclosure, the possibility to enable the output branches of the driving circuit in a different way (for example, simply alternatively) is not excluded.

The proposed values of the ratio between the partial maximum current and the partial minimum current of each partial working range are purely indicative, and are not to be read in a limitative way.

Similarly, it may be possible to obtain the biasing current by scaling the programming current in any other way (for example, by increasing it at the lower partial working ranges); anyway, the reference voltage may be generated in a different way (for example, so as to vary always in the same range for all the partial working ranges).

Equivalent implementations of the output branches of the driving circuit are feasible (for example, by using different operational amplifiers, with switches connecting the inverting input terminal of each partial working range to the corresponding sensing resistor and to that of one or more of the lower partial working ranges).

Besides, nothing prevents dimensioning the power transistors and/or the sensing resistors of each output branch of the driving circuit in a different way.

Anyway, the proposed values of the resistance of the sensing resistors (in relation to the offset voltage of the operational amplifier) are purely indicative and in no way limitative.

Naturally, the output branches of the driving device may be enabled selectively with other circuits.

Similar considerations apply if the partial working range wherein the global output current falls is determined in a different way.

Besides, the driving device may have an equivalent programming interface; more generally, it is possible to use any other storage element (also at more bits) for setting the partial working range wherein the global output current falls.

It should be readily apparent that an embodiment of the structure might be part of the design of an integrated circuit, which may be part of a larger system. The design may also be created in a programming language; moreover, if the designer does not fabricate chips or masks, the design may be transmitted by physical means to others. In any case, the resulting integrated circuit may be distributed by its manufacturer in raw wafer form, as a bare die, or in packages. Moreover, an embodiment may be integrated with other circuits in the same chip, or it may be mounted in intermediate products (such as mother boards) and coupled with one or more other chips (such as a processor or a memory). In any case, such an integrated circuit is suitable to be used in complex systems (such as computer monitors, sport stadium panels, commercial panels, and the like).

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. A driving device for supplying at least one regulated global output current to a load, the driving device including:
    a programming circuit for programming a value of the global output current within a global current range,
    a reference circuit for supplying a reference voltage having a value corresponding to the value of the global output current,
    a conversion circuit for converting the reference voltage to the global output current,
    the conversion circuit including a plurality of conversion units for corresponding partial current ranges partitioning the global current range, each conversion unit being adapted to convert the reference voltage into a partial output current contributing to the global output current, the partial output current being within the corresponding partial current range, and
    wherein the driving device further includes a control circuit for selectively enabling the conversion units according to the partial current range wherein the global output current falls and for controlling the reference voltage so as to change to a partial voltage range for each partial current range, the partial voltage ranges being at least partly superimposed;
    wherein the conversion circuit includes an operational amplifier having a first input terminal being coupled with the reference circuit for receiving the reference voltage, a second input terminal for each conversion unit and an output terminal, wherein each conversion unit includes a sensing resistor and a power transistor being connected in series, the power transistor having a control terminal, and wherein the control circuit includes a switch for selectively coupling the sensing resistors to the second input terminals of the operational amplifier and the control terminals of the power transistors to the output terminal of the operational amplifier.

2. The driving device according to claim 1, wherein each partial current range is a fraction of the global current range, each power transistor having a size being directly proportional to the fraction of the corresponding partial current range, and each sensing resistor having a resistance being inversely proportional to the fraction of the corresponding partial current range.

3. The driving device according to claim 1, wherein the operational amplifier has an offset voltage, the sensing resistors being dimensioned to have the reference voltage at least equal to 10 times the offset voltage.

4. The driving device according to claim 1, wherein the sensing resistor and the control terminal of the power transistor of the smallest partial current range are connected to the corresponding second input terminal and to the output terminal, respectively, of the operational amplifier, for each partial current range being different from the smallest partial current range the switching means including a set of first switches for connecting the sensing resistor of the partial current range and of at least one of the lower partial current ranges to the corresponding second input terminal of the operational amplifier, and a second switch for connecting the control terminal of the power transistor of the partial current range to the output terminal of the operational amplifier.

5. A current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
wherein the reference stage comprises:
a first transistor configured to generate a first reference current;
a second transistor configured to generate a second reference current;
a reference impedance coupled to the first and second transistors and configured:
to convert the first reference current into the first reference signal; and
to convert the second reference current into the second reference signal;
a first switch coupled between the first transistor and the reference impedance; and
a second switch coupled between the second transistor and the reference impedance.

6. A current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
wherein:
the output stage further comprises:
an amplifier having a first input node configured to receive the first and second reference signals, a second input node, a third input node, and an amplifier output node;
the one of the first and second branches of the output stage comprises a first sense impedance having a first sense node coupled to the second input node of the amplifier and a first transistor coupled between the regulated-current output node and the first sense node and having a control node coupled to the amplifier output node; and
the other of the first and second branches of the output stage comprises a second sense impedance having a second sense node coupled to the third input node of the amplifier and a second transistor coupled between the regulated-current output node and the second sense node and having a second control node coupled to the amplifier output node.

7. A current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
wherein:
the output stage further comprises:
an amplifier having a first input node configured to receive the first and second reference signals, a second input node, a third input node, and an amplifier output node;
the one of the first and second branches of the output stage comprises a first sense impedance having a first sense node coupled to the second input node of the amplifier and a first transistor coupled between the regulated-current output node and the first sense node and having a control node coupled to the amplifier output node;
the other of the first and second branches of the output stage comprises a second sense impedance having a second sense node coupled to the third input node of the amplifier and a second transistor coupled between the regulated-current output node and the second sense node and having a second control node coupled to the amplifier output node; and
the output stage further comprises:
a first switch coupled between the amplifier output node and the control node of the second transistor; and
a second switch coupled between the second sense node and the third input node of the amplifier.

8. A current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
wherein:
the output stage further comprises:
an amplifier having a first input node configured to receive the first and second reference signals, a second input node, a third input node, and an amplifier output node;
the one of the first and second branches of the output stage comprises a first sense impedance having a first sense node coupled to the second input node of the amplifier and a first transistor coupled between the regulated-current output node and the first sense node and having a control node coupled to the amplifier output node;
the other of the first and second branches of the output stage comprises a second sense impedance having a second sense node coupled to the third input node of the amplifier and a second transistor coupled between the regulated-current output node and the second sense node and having a second control node coupled to the amplifier output node; and
the output stage further comprises:
a first switch coupled between the amplifier output node and the control node of the second transistor;
a second switch coupled between the second sense node and the third input node of the amplifier; and a third switch coupled between the first sense node and the third input node of the amplifier.

9. A current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
the current regulator further comprising:
an input stage comprising:
a programming node;
a transistor configured to generate a bias signal at the programming node; and
an amplifier having an output node and a first input node coupled to the programming node, and having a second input node configured to receive a reference signal.

10. An integrated circuit, comprising:
a current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
the integrated circuit further comprising:
an input stage comprising:
a programming node;
a transistor having a control node and a path node coupled to the programming node and configured to generate a programming current into the programming node; and
a unity gain amplifier having an output node and a first input node coupled to the programming node, and having a second input node configured to receive an input reference signal;
wherein the first reference branch comprises a first reference transistor configured to generate a first reference current by mirroring the programming current;
wherein the second reference branch comprises a second reference transistor configured to generate a second reference current by mirroring the programming current;
wherein the reference stage comprises a reference impedance coupled to the first and second reference transistors and configured to convert the first reference current into the first reference signal and to convert the second reference current into the second reference signal;
wherein the output stage further comprises an amplifier having a first input node configured to receive the first and second reference signals, a second input node, a third input node, and an amplifier output node;
wherein the one of the first and second branches of the output stage comprises a first sense impedance having a first sense node coupled to the second input node of the amplifier and a first output transistor coupled between the regulated-current output node and the first sense node and having a control node coupled to the amplifier output node; and
wherein the other of the first and second branches of the output stage comprises a second sense impedance having a second sense node coupled to the third input node of the amplifier and a second output transistor coupled between the regulated-current output node and the second sense node and having a second control node coupled to the amplifier output node.

11. An integrated circuit, comprising:
a current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
the integrated circuit further comprising:
an input stage comprising:
a programming node;
a transistor having a control node and a path node coupled to the programming node and configured to generate a programming current into the programming node; and
a unity gain amplifier having an output node and a first input node coupled to the programming node, and having a second input node configured to receive an input reference signal;
wherein the first reference branch comprises a first reference transistor configured to generate a first reference current by mirroring the programming current and a first reference switch serially coupled to the first reference transistor;
wherein the second reference branch comprises a second reference transistor configured to generate a second reference current by mirroring the programming current and a second reference switch serially coupled to the second reference transistor;
wherein the reference stage comprises a reference impedance coupled to the first and second reference switches and configured to convert the first reference current into the first reference signal and to convert the second reference current into the second reference signal;
wherein the output stage further comprises an output amplifier having a first input node configured to receive the first and second reference signals, a second input node, a third input node, and an amplifier output node;
wherein the one of the first and second branches of the output stage comprises a first sense impedance having a first sense node coupled to the second input node of the amplifier and a first output transistor coupled between the regulated-current output node and the first sense node and having a control node coupled to the amplifier output node; and
wherein the other of the first and second branches of the output stage comprises a second sense impedance having a second sense node coupled to the third input node of the amplifier and a second output transistor coupled between the regulated-current output node and the second sense node and having a second control node coupled to the amplifier output node; and
wherein the output stage comprises:
a first output switch coupled between the second sense node and the third input node of the output amplifier; and a second output switch coupled between the control node of the second output transistor and the amplifier output node.

12. An integrated circuit, comprising:
a current regulator, comprising:
a reference stage having at least first and second reference branches configured to generate respective first and second reference signals; and
an output stage having a regulated-current output node and at least first and second output branches, one of the first and second output branches configured to generate a regulated output current at the output node in response to one of the first and second reference signals, the first and second output branches together configured to generate the regulated output current in response to the other of the first and second reference signals;
the integrated circuit further comprising:
an input stage comprising:
a programming node;
a transistor having a control node and a path node coupled to the programming node and configured to generate a programming current into the programming node; and
a unity gain amplifier having an output node and a first input node coupled to the programming node, and having a second input node configured to receive an input reference signal;
wherein the first reference branch comprises a first reference transistor configured to generate a first reference current by mirroring the programming current and a first reference switch serially coupled to the first reference transistor;
wherein the second reference branch comprises a second reference transistor configured to generate a second reference current by mirroring the programming current and a second reference switch serially coupled to the second reference transistor;
wherein the reference stage comprises a reference impedance coupled to the first and second reference switches and configured to convert the first reference current into the first reference signal and to convert the second reference current into the second reference signal;
wherein the output stage further comprises an output amplifier having a first input node configured to receive the first and second reference signals, a second input node, a third input node, and an amplifier output node;
wherein the one of the first and second branches of the output stage comprises a first sense impedance having a first sense node coupled to the second input node of the amplifier and a first output transistor coupled between the regulated-current output node and the first sense node and having a control node coupled to the amplifier output node; and
wherein the other of the first and second branches of the output stage comprises a second sense impedance having a second sense node coupled to the third input node of the amplifier and a second output transistor coupled between the regulated-current output node and the second sense node and having a second control node coupled to the amplifier output node; and
wherein the output stage comprises:
a first output switch coupled between the second sense node and the third input node of the output amplifier;
a second output switch coupled between the control node of the second output transistor and the amplifier output node; and
a third switch coupled between the first sense node and the third input node of the output amplifier.

* * * * *